United States Patent
Bourdon et al.

[11] Patent Number: 6,044,318
[45] Date of Patent: Mar. 28, 2000

[54] POWERTRAIN CONTROL SYSTEM

[75] Inventors: Klaus Bourdon, Hettenhausen, Germany; Martin Roy Haggett, Rugby, United Kingdom; Deiter Meisberger; Axel Rose, both of Munich, Germany; Andrew Peter Woolley, Stroud, United Kingdom

[73] Assignees: Rover Group Limited, Warwick, United Kingdom; Bayerische Motoren Werke AG, Munich, Germany

[21] Appl. No.: 09/101,863

[22] PCT Filed: Jan. 22, 1997

[86] PCT No.: PCT/GB97/00162

§ 371 Date: Jul. 21, 1998

§ 102(e) Date: Jul. 21, 1998

[87] PCT Pub. No.: WO97/27388

PCT Pub. Date: Jul. 31, 1997

[30] Foreign Application Priority Data

Jan. 25, 1996 [GB] United Kingdom .................. 9601479

[51] Int. Cl.⁷ ........................ B60K 41/06; F02D 11/10; F02D 41/04
[52] U.S. Cl. ............................ 701/65; 701/110; 477/111; 123/399
[58] Field of Search ..................... 123/361, 396, 123/399; 180/197; 477/111; 701/54, 65, 84, 85, 110

[56] References Cited

U.S. PATENT DOCUMENTS

| | | | |
|---|---|---|---|
| 4,693,111 | 9/1987 | Arnold et al. | 73/118.1 |
| 4,853,720 | 8/1989 | Onari et al. | 701/110 |
| 4,881,428 | 11/1989 | Ishikawa et al. | 477/110 |
| 4,969,377 | 11/1990 | Lin | 123/396 |
| 5,222,570 | 6/1993 | Kawamura et al. | 180/197 |
| 5,265,570 | 11/1993 | Schnaibel et al. | 123/339.24 |
| 5,391,127 | 2/1995 | Nishimura | 477/110 |
| 5,638,790 | 6/1997 | Minowa et al. | 123/399 |
| 5,642,712 | 7/1997 | Biondo | 123/396 |
| 5,679,092 | 10/1997 | Otsubo et al. | 180/197 |
| 5,775,293 | 7/1998 | Kresse | 123/396 |

FOREIGN PATENT DOCUMENTS

| | | |
|---|---|---|
| 0322790 | 7/1989 | European Pat. Off. . |
| 0647773 | 4/1995 | European Pat. Off. . |
| 0548533 | 1/1997 | European Pat. Off. . |
| 2483012 | 11/1981 | France . |
| 4142498 | 6/1993 | Germany . |
| 2154763 | 9/1985 | United Kingdom . |
| 2265994 | 10/1993 | United Kingdom . |
| 2273580 | 6/1994 | United Kingdom . |
| 2277610 | 11/1994 | United Kingdom . |
| 97/12773 | 4/1997 | WIPO . |

*Primary Examiner*—Willis R. Wolfe
*Attorney, Agent, or Firm*—Davis and Bujold

[57] ABSTRACT

A powertrain control system is disclosed in which an electronic control unit (ECU) (13) controls a power output actuator (10) to drive a fuelling element (12) of an internal combustion engine (not shown). The ECU (13) receives a signal of demanded power from an accelerator pedal demand potentiometer 915) and signal of required power output characteristic (20, 21) from a range switch (16). The ECU (13) selects the required power output characteristic (20, 21) from memory (14) and applies it to control the power output actuator (10) in relation to the pedal demand signal (25) from the demand potentiometer (15). It is thus possible to select between plural power output characteristics (20, 21) depending on vehicle use or driving conditions.

12 Claims, 4 Drawing Sheets

POWERTRAIN CONTROL SYSTEM

FIELD OF THE INVENTION

This invention relates to powertrain control systems for motor vehicles.

BACKGROUND TO THE INVENTION

It is becoming increasingly common to eliminate the traditional direct link, (usually a mechanical linkage such as a "Bowden" cable), between the driver operated accelerator pedal of a motor vehicle and the fuelling system of its engine. It is replaced with electrical control of the engine fuelling, normally in the form of an engine management system running closed loop feed-back control. Such systems are commonly known in the art as "drive by wire".

"Drive by wire" systems usually employ a pedal demand potentiometer connected to the driver operated accelerator pedal to provide a signal of demanded power to the engine management system. The engine management system controls the supply of fuel and air to the engine in response to that pedal demand signal.

When a vehicle is to be used off-road, in conditions where the surface over which it is travelling is rough or uneven, there is a requirement for a low sensitivity in the accelerator pedal, at least over the initial range of pedal travel. This is because there is generally a lot of vibration which makes the vehicle hard to control if the accelerator is too sensitive. On the other hand, for on-road driving, where the driving surface is relatively smooth, a more sensitive accelerator pedal is usually preferable to give a more powerful feel to the vehicle. Known systems generally result in a compromise between these conflicting requirements.

EP 0 322 790 discloses a slip control system in which various throttle characteristics are available which limit the power available to varying degrees. The control system changes between characteristics to reduce power if slip is detected.

GB 2154763 and FR 2483012 each disclose a system having different throttle characteristics which are selectable by the driver to give the driving characteristics required, such a sporty feel or economy of fuel.

U.S. Pat. No. 5,111,570 discloses a throttle regulated traction control system which varies the response of the throttle so as to match the slip rate of the drive wheels with a target slip rate. The object of U.S. Pat. No. 5,111,570 is to prevent a loss of speed when driving on rough roads which might result from an erroneously high determination of the slip rate and subsequently undue decrease in the driving force available.

The problem outlined above has not been addressed by the prior art.

SUMMARY OF THE INVENTION

Accordingly, the present invention provides a powertrain control system for a motor vehicle comprising a power output varying means for varying the power output of the vehicle powertrain, a driver operated power demand means for producing a power demand signal, detection means for detecting whether the vehicle is in an on-road driving condition or an off-road driving condition, and a control means operative to control said varying means in response to said power demand signal in accordance with a control characteristic wherein said control means can select either of first and second different control characteristics over at least a range of conditions of the power demand means, characterized in that the power demand means is movable by a driver through a range of positions to vary the power demand signal, in that when the first characteristic is selected, for low displacements of the power demand means, the control means is more sensitive to changes in the power demand signal than when the second characteristic is selected, and in that the control means is arranged to select the first characteristic when the vehicle is in the on-road condition and the second characteristic when the vehicle is in the off-road condition.

The power varying means may comprise a throttle valve or a fuel supply system such as a fuel injection system.

Preferably the characteristics relate the condition of the power output varying means to the power demand signal.

Preferably each of the characteristics is applicable over substantially the full range of operable conditions of the power output varying means.

Preferably, over said range of conditions of the power demand means, for any specific condition within that range, the condition of the power output varying means produced by the first characteristic corresponds to a greater power output than that produced by the second characteristic.

Alternatively, the characteristics may be low-pass filter characteristics for filtering the power demand signal.

Preferably the detection means is arranged to operate by detecting selection of a gear ratio or range of gear ratios in the powertrain. This has the advantage that the change of power output characteristic will not disrupt the normal driving of the vehicle. In this case the on- and off-road conditions are defined by the gear ratios or ranges currently selected.

The system may be for use in a vehicle having a range change means for selecting one of two ranges of gear ratios, and a gear change means for selecting gear ratios within said ranges, in which case the detection means is preferably arranged to detect changes of range of the range change means. This is because a change of range is usually associated with a change of driving conditions, such as between on- and off-road driving. The detection means can comprise a simple switch operated by the gear selector mechanism, or a control unit which actually controls the operation of the range change means.

Preferably the control means is arranged to select the first characteristic when the range change means is in high range, and the second characteristic when the range change means is in low range.

The pedal demand signal may be a single continuously variable signal or a compound demand signal as disclosed in U.S. Pat. No. 4,693,111 or DE 4142498.

The invention will now be described by way of example with reference to the accompanying drawings, in which:

DETAILED DESCRIPTION OF THE PREFERRED EMBODIMENTS

Figure 1:
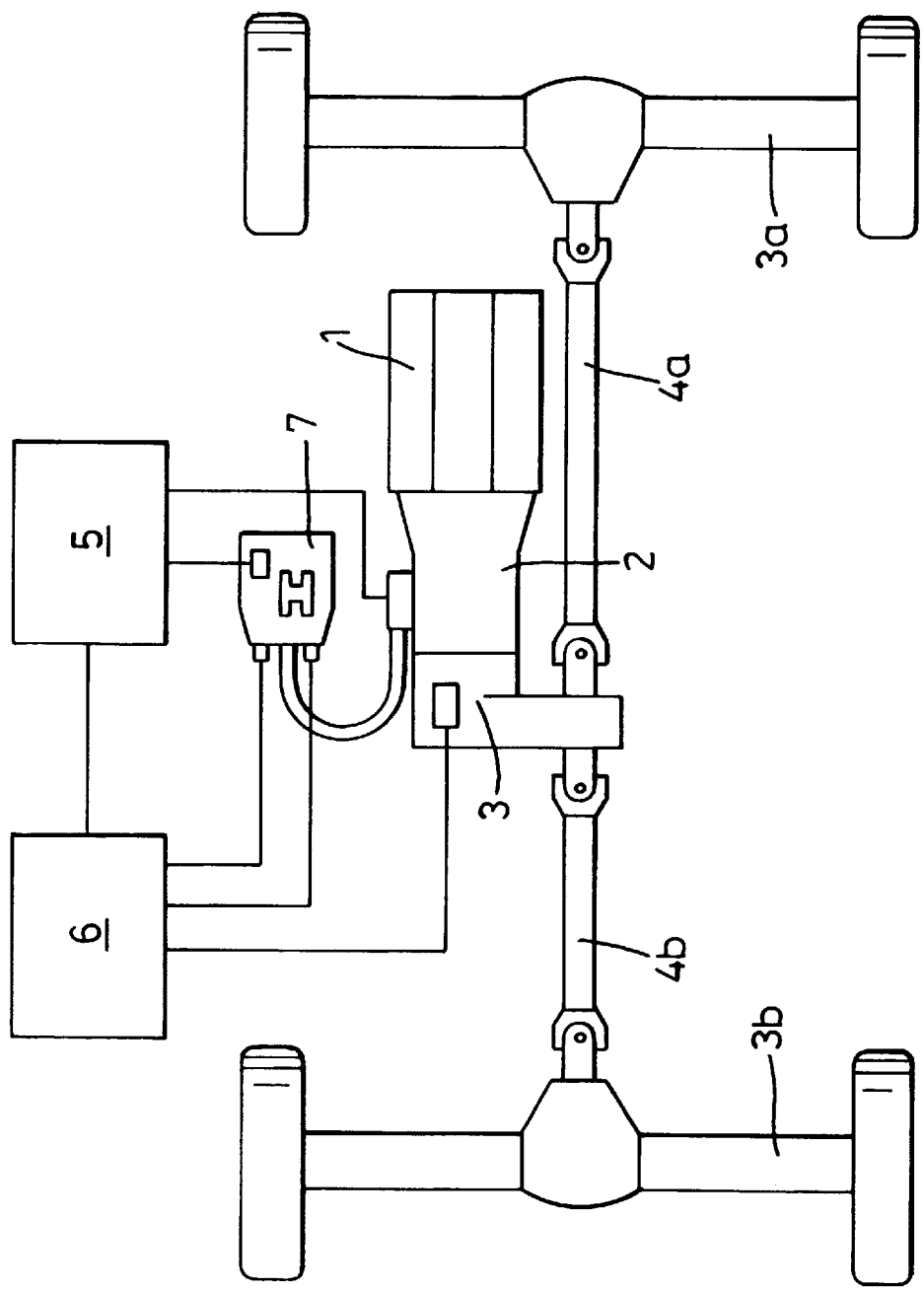
FIG. 1 is a schematic view of a system according to the invention.

With reference to FIG. 1 a powertrain control system for a motor vehicle comprises an engine 1, an automatic gearbox 2, and a range change transmission 3 from which power is transmitted to the front and rear drive shafts 3a, 3b by respective propeller shafts 4a, 4b. The gearbox 2 is controlled by a gearbox control unit 5 and the range change transmission 6 is controlled by a range change control unit 6 each of which responds to operation by the driver of an H-gate gear selector mechanism such as that described in WO95/12773.

Figure 2:
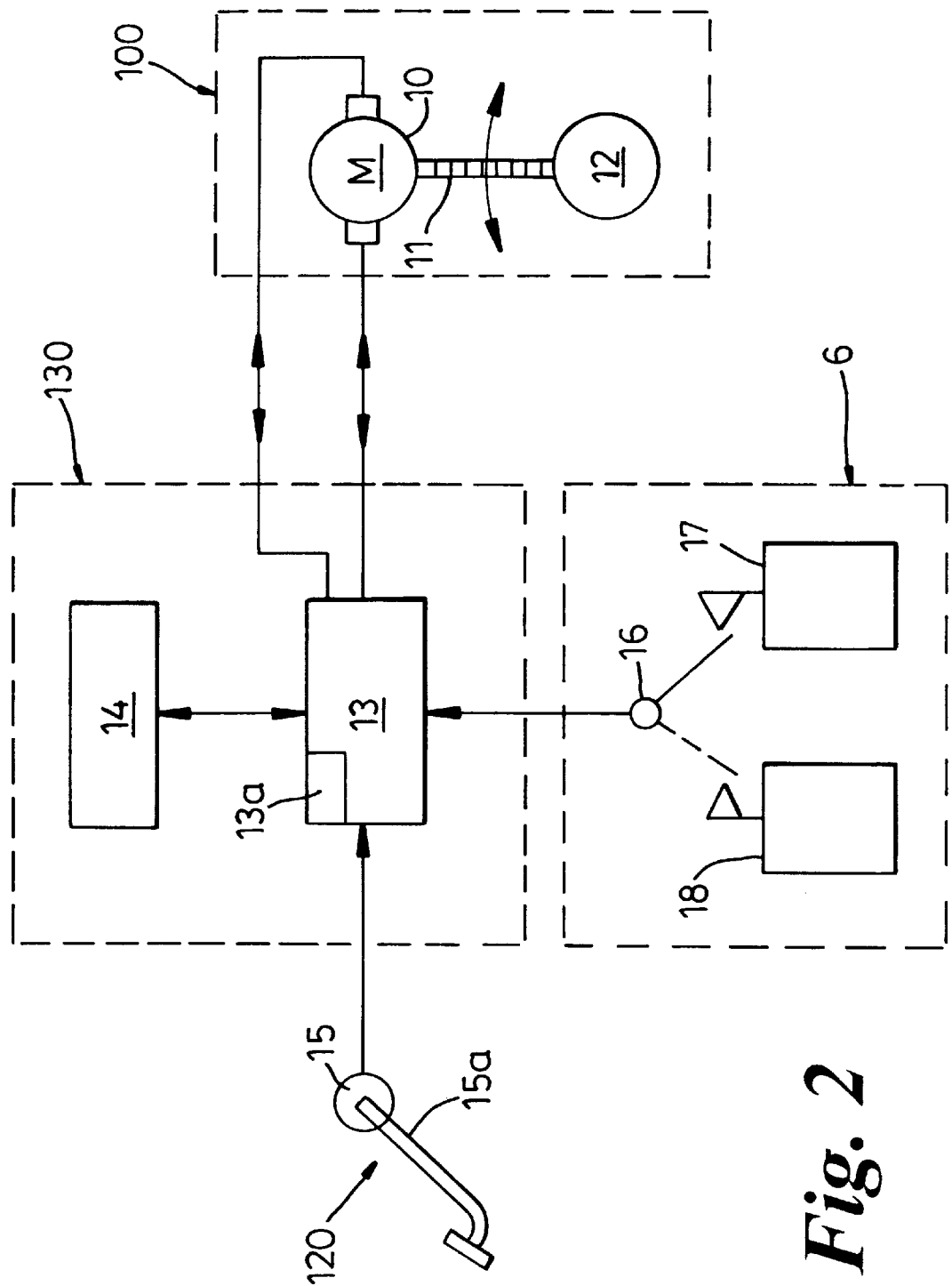
FIG. 2 is a schematic block diagram of part of the embodiment of FIG. 1.

Referring to FIG. 2, the power output of the engine 1 is controlled by a power output varying means 100 in the form of a D.C. motor 10 bi-directionally driving a throttle shaft 11 on which is held a throttle butterfly 12 which controls the air flow entering the engine 1. The D.C. motor 10 operates off a nominal 12V D.C. supply controlled by a control means 130 in the form of an electronic control unit (ECU) 13 in communication with a memory 14. The ECU 13 receives an input from a power demand means 120 in the form of a pedal demand potentiometer 15 which is arranged to produce a pedal demand signal which is dependent on the position of the accelerator pedal 15a. The pedal demand signal varies over the total range of accelerator pedal travel and is a continuously variable voltage rising from 0.5V D.C. for zero pedal displacement to 5V D.C. for wide full pedal displacement. The ECU 13 also receives from the range change control unit 6 an input indicative of the state of the range change transmission, the signal indicating whether it is in high range 17 or low range 18.

Figure 3:
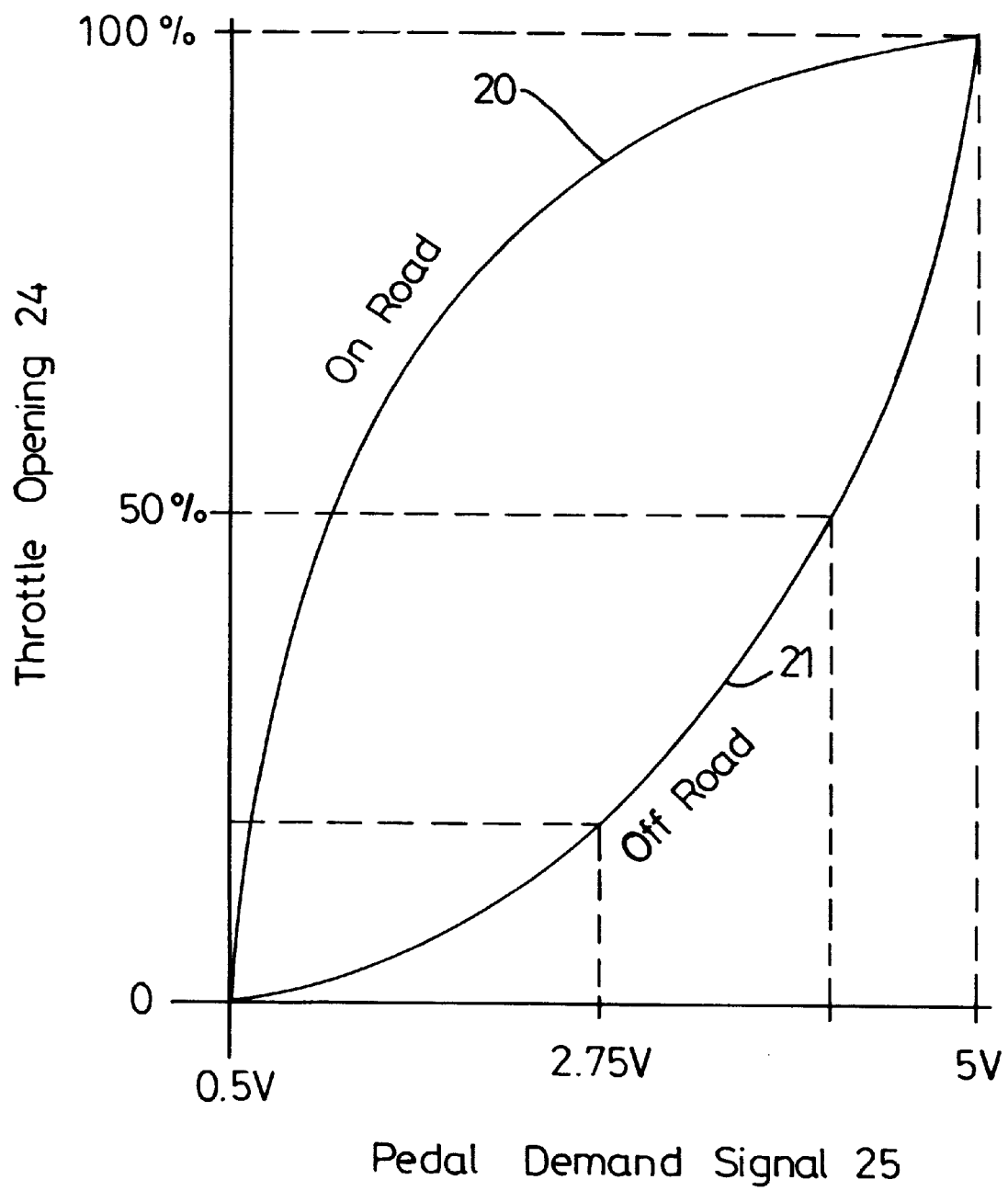
FIG. 3 is a graphical representation of the power output characteristics used by the system of FIGS. 1 and 2.

Referring to FIG. 3, stored in the memory 14 are two power output characteristics in the form of an on-road characteristic 20 and an off-road characteristic 21. The characteristics 20, 21 relate the throttle opening 24 produced by the D.C. motor 10 to the pedal demand signal 25 derived from the pedal demand potentiometer 15. The characteristics 20, 21 are selected by the ECU 13 depending on the state of the range change transmission 3. The on-road characteristic 20 is selected when the range change transmission 3 is in the high range 17 and the off-road characteristic 21 is selected when the range change transmission 3 is in the low range 18.

The characteristics 20, 21 both start at the same point giving zero throttle opening 24 for a pedal demand signal 25 corresponding to zero pedal travel. For low accelerator pedal displacement, i.e. low pedal demand signals 25, the on-road characteristic 20 is steeper than the off-road characteristic 21, giving greater throttle opening 24 for the same amount of pedal movement. At high pedal displacements, i.e. high pedal demand signals 25, the on-road characteristic 20 becomes less steep and the off-road characteristic 21 becomes more steep. In this region the on-road characteristic 20 therefore gives less change in throttle opening 24 for a given amount of pedal movement than the off-road characteristic 21. Characteristics 20, 21 therefore converge towards their upper ends and meet at a point where full accelerator pedal depression produces a wide open throttle.

By providing plural power output characteristics 20, 21, the present invention can accommodate the special needs of different driving conditions. When the on-road characteristic 20 is employed, the driver will experience a fairly sharp response to relatively small movements of the accelerator pedal and will benefit from a lively feel to the vehicle performance at low pedal displacements. This response is not suitable for off-road use, however, when the off-road characteristic 21 will be selected. Throttle progression suitable for controlled driving across mud and grass, and across uneven surfaces, is best achieved by a power output characteristic which provides only low torque modulation during the initial travel of the accelerator pedal, which effect is produced by a low throttle opening 24. The initially low throttle opening 24 reduces wheel-spin and subsequent loss of traction on slippery surfaces and will reduce jerkiness which can result from the almost inevitable foot bounce encountered during travel across rough surfaces or during off-road travel.

The reduction of jerkiness is further enhanced by careful selection of an input filter characteristic by a filter means 13a in the ECU 13 appropriate for each range 17, 18. The filter means may be implemented in hardware or software and selects the input filter characteristic under the control of the ECU 13. In this example, the filter is a constants low pass filter and the ECU 13 is arranged to apply a separate filter characteristic (not shown) to the pedal demand signal 25 for each power output characteristic 20, 21 selected. The filter operates by only passing pedal demand signals 25 at low frequencies to eliminate the higher frequency signals associated with involuntary jerking of the driver's foot over a rough surface. The filter is further operative to eliminate jerkiness induced in the pedal demand signal 25 by vibrations transmitted through the vehicle structure, whether originating from the surface being traversed or by vehicle systems such as electrical vibrations, the engine, suspension, steering or transmission.

In high range 18 the filter characteristic achieves a compromise between throttle response and the low levels of jerkiness found on smooth surfaces by filtering out only frequencies above 10 Hz. The compromise results from the assumption that vibrations of frequencies below 10 Hz are not likely to be significant enough during normal driving to justify the extra propagation delay in trying to capture them for elimination. The ECU 13 needs only to wait 100 ms after receiving a pedal demand signal 25 and implementing the corresponding throttle opening 24 when the high range 17 filter characteristic has been selected. The corollary of the high range 17 assumption is that across rough surfaces frequencies between 5 and 10 Hz caused by pedal jerkiness and vibrations of the vehicle do in fact need to be filtered out. It is thus necessary to set a lower cut-off frequency for the filter during off-road use and in this case it is set at 5 Hz. In low range 18 the propagation delay through the filter is therefore 200 ms and doubles the time between the pedal demand signal 25 being supplied and implemented as a throttle opening 24.

Only when all the power output is really needed is it necessary to depress the accelerator pedal to its maximum travel and, as can be seen from FIG. 3, the characteristics 20, 21 converge towards their upper limits so all the power is available in each range 17, 18.

Figure 4:
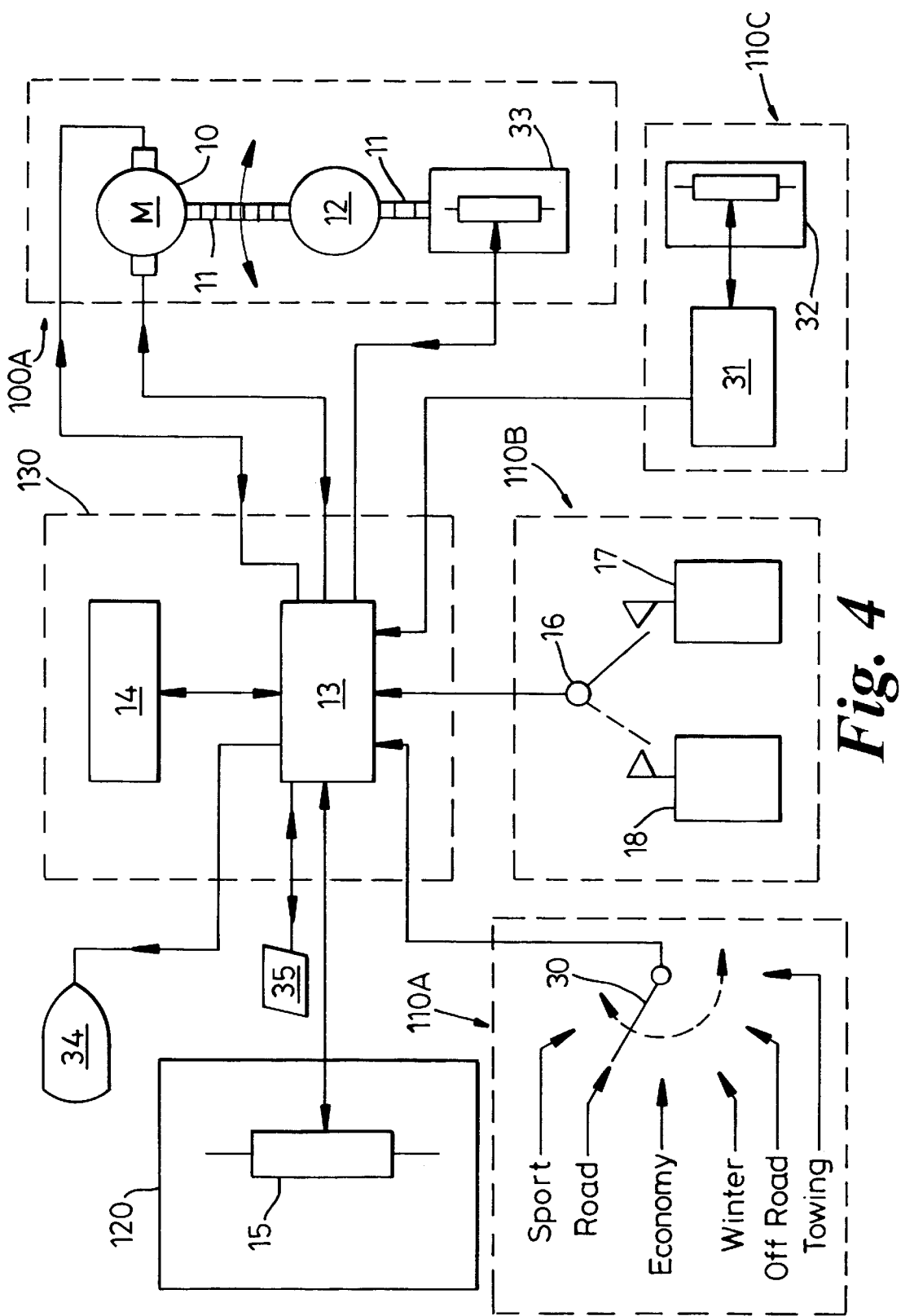
FIG. 4 is a schematic block diagram of a second embodiment of the invention.

Referring now to FIG. 4, a second embodiment of the present invention will be described, functional parts corresponding to those in FIG. 2 being given corresponding reference numerals. The ECU 13 receives inputs from three characteristic selecting means, 110A, 110B and 110C comprising respectively: a manually operated rotary switch 30 mounted on the dash panel of the vehicle; a range changing switch operated by an H-gate gear selector mechanism corresponding to that of FIG. 1 and a driving condition sensing means comprising a suspension controller 31 and four suspension potentiometers 32 each indicating the vertical position of one of the wheels of the vehicle.

The rotary switch 30 has six positions each of which is operative to cause the ECU 13 to select a corresponding power output characteristic (not shown) from memory 14 for the position chosen, i.e. "sport mode", "road mode", "economy mode", "winter mode", "off road mode" and "towing mode".

A signal from the suspension controller 31 supplied to the ECU 13 is derived from the suspension potentiometers 32 and indicates whether the vehicle is travelling under conditions equivalent to off-road use. If the vehicle is travelling across a rough surface, as is often the case during off-road use, the suspension controller 31 sends a signal to the ECU 13 which upon receipt thereof selects the off-road characteristic 21.

The ECU 13 is arranged to prioritise the output characteristic selecting means 110A, 110B and 110C such that if the vehicle ventures off-road the ECU 13 will always select the off-road characteristic 21 from memory 14. To achieve this, the signal from the suspension controller 31 will always over-ride the other two characteristic selecting means 110A and 110B. When the ECU 13 determines that the vehicle is no longer travelling off-road as a result of a signal from the suspension controller 31, it will re-select the power output characteristic determined by the subservient characteristic selecting means 110A or 110B in order of their respective priorities.

The signal from the range switch 16 is next in the order of priority and will over-ride the rotary switch 30, such that if the driver selects low ratio the ECU 13 will assume that the vehicle is about to travel off-road and will select the off-road characteristic 21 from memory 14. When the range switch 16 is moved to its high range 17 position, the ECU 13 will revert to the power output characteristic under selection by the rotary switch 30, subject in all cases to the over-riding priority of the signal from the suspension controller 31.

To prevent a jerk when changing between characteristics 20, 21 the change-over is only carried out when the engine is under idle speed control. This occurs during every change of state of range switch 16 as range-changing is under the control of the range change control unit which must see an input signal of engine speed indicative of an idling condition before it will permit such a range-change. If a change of characteristic is attempted whilst the vehicle is moving, the change-over will not be implemented until the accelerator pedal has returned to its zero travel position, at which point the characteristics meet and a smooth change can be effected. A message to lift off the accelerator pedal will appear on a display means and when the driver obeys this instruction a change-over by the ECU 13 will occur.

The display means is in the form of an LCD display 34 mounted within the instrument binnacle (not shown) which receives and displays a signal from the ECU 13 indicative of the power output characteristic currently under selection. It may display further messages under the control of the ECU 13, such as the instruction to lift off the accelerator pedal discussed above.

The power output actuator means 100A of FIG. 4 includes a D.C. motor 10, throttle shaft 11 and throttle butterfly 12 corresponding to those of FIG. 1 and further comprises feedback means in the form of a throttle position potentiometer 33 mounted on the throttle shaft 11. The throttle position potentiometer 33 provides feedback to the ECU 13 of the position to which the D.C. motor 10 has driven the throttle butterfly 12 and the rate at which the throttle butterfly 12 is moving, thereby providing for closed-loop feedback control.

A communication means is provided in the form of an input/output port 3) which is arranged to provide communications between the ECU 13 and an external device (not shown). The port 35 provides a user with the opportunity to change any characteristics stored in the memory 14 and to perform tuning or diagnostic routines subject to suitable functionality being included in the ECU 13.

The further characteristics disclosed by the rotary switch 30 of FIG. 4 are also stored in the memory 14, but are not shown in FIG. 2. The "sport mode" is characterised by a sharper response than any other characteristic at low accelerator pedal movement. The "economy mode" reduces available throttle opening at the upper limits of accelerator pedal movement, thereby reducing power in cruise conditions and thus saving fuel. The "winter mode" provides a system in which the off-road characteristic 21 is selected in high range 17 to prevent wheel spin in snow. The "towing mode" selects the off-road characteristic 21 at pull-away to reduce the likelihood of wheel spin, and then ramps up to meet the on-road characteristic 20.

The powertrain control system disclosed herein is not limited to controlling a throttle butterfly. Fuel injection systems for many current petrol and diesel engines have injectors or fuel pumps suitable for this kind of control. Modern transmissions, such as "continuously variable transmissions", lend themselves to the manner of control disclosed herein, as does the supply of electrical power to a traction motor of an electrically propelled vehicle. The demand means of the present invention is not limited to an accelerator pedal and may be in another form, such as a hand throttle or a twist-grip. The driving condition sensing means is not limited to a suspension control system and may be any device or system which includes automatic generation of an off-road signal when the vehicle is travelling over rough or uneven surfaces. One example of such another system is an anti-lock braking system, can include an adaptive algorithm to detect changes in road surface from the difference in speeds of the vehicles wheels.

The selection of different filter characteristics for application to the pedal demand signal 25 may be performed independently of the provision of different power output characteristics 20, 21. It would be possible to use the same techniques to apply such different filter characteristics to existing systems which have only one power output characteristic, thereby substantially eliminating the jerkiness discussed above.

What is claimed is:

1. A powertrain control system for a motor vehicle having a range change means for selecting one of two ranges of gear ratios, comprising:

a power output varying means for varying the power output of the vehicle powertrain, a driver operated power demand means for producing a power demand signal, detection means for detecting whether the vehicle is in one of an on-road driving condition and an off-road driving condition;

a control means operative for controlling said varying means in response to said power demand signal in accordance with a control characteristic, and said control means can select either of first and second different control characteristics over at least a range of conditions of the power demand means, wherein the power demand means is movable by a driver through a range of positions to vary the power demand signal, and when the first control characteristic is selected, for low displacement of the power demand means, the control means is more sensitive to changes in the power demand signal than when the second control characteristic is selected, and the control means is arranged to select the first control characteristic when the vehicle is in the on-road condition and the second control characteristic when the vehicle is in the off-road condition;

the detection means is arranged to operate by detecting selection of a gear ratio or a range of gear ratios in the powertrain;

a gear change means for selecting gear ratios within said range of gear ratios, and the detection means is arranged to detect changes of range of the range change means.

2. The system according to claim 1 wherein the first and second control characteristics relate the condition of the power output varying means to the power demand signal.

3. The system according to claim 1 wherein each of the first and second control characteristics is applicable over substantially a full range of operable conditions of the power output varying means.

4. The system according to claim 1 wherein the first and second control characteristics converge at upper ends thereof so that a maximum power available is substantially the same for each of the first and second control characteristics.

5. The system according to claim 1 wherein the first and second control characteristics are low-pass filter characteristics for filtering the power demand signal.

6. The system according to claim 1 wherein the control means is arranged to select the first control characteristic, when the range change means is in high range, and the second control characteristic, when the range change means is in low range.

7. The system according to claim 1 wherein the detection means comprises vibration detection means for detecting vibrations in the vehicle.

8. The system according to claim 1 wherein the power demand signal is continuously variable over a range of travel of the power demand means.

9. The system according to claim 1 wherein, over said range of conditions of the power demand means, for any specific condition within that range, the condition of the power output varying means produced by the first control control characteristic corresponds to a greater power output than that produced by the second control characteristic.

10. The system according to claim 9 wherein the first and second control characteristics converge at lower ends thereof so that a minimum power available is substantially the same for each of the first and second control characteristics.

11. The system according to claim 1 wherein the power demand means comprises an accelerator pedal and the power demand signal is dependent on the position of the accelerator pedal such that when the first control characteristic is selected, the control means is more sensitive to changes in position of the accelerator pedal than when the second control characteristic is selected.

12. The system according to claim 11 wherein the pedal demand signal varies over a total range of travel of the accelerator pedal.

* * * * *